(12) United States Patent
Bartscht et al.

(10) Patent No.: US 7,249,418 B2
(45) Date of Patent: Jul. 31, 2007

(54) WHEEL POSITION SENSOR

(75) Inventors: Manfred Bartscht, Salzkotten (DE); Steffen Hoppe, Lippstadt (DE); Dirk Hobein, Ann Arbor, MI (US); Steven Lietaert, Lambertville, MI (US)

(73) Assignees: Hella KG a.A. Hueck & Co., Lippstadt (DE); Hella Electronics Corporation, Plymouth Twp., MI (US)

( * ) Notice: Subject to any disclaimer, the term of this patent is extended or adjusted under 35 U.S.C. 154(b) by 141 days.

(21) Appl. No.: 10/986,219

(22) Filed: Nov. 12, 2004

(65) Prior Publication Data

US 2006/0101656 A1    May 18, 2006

(51) Int. Cl.
*G01B 11/26* (2006.01)
*G01B 5/24* (2006.01)

(52) U.S. Cl. .................. 33/203.18; 33/203; 33/203.12

(58) Field of Classification Search .................. 33/203, 33/203.12, 203.18; 73/146, 460
See application file for complete search history.

(56) References Cited

U.S. PATENT DOCUMENTS

| | | | | |
|---|---|---|---|---|
| 4,918,821 A | * | 4/1990 | Bjork | ...................... 33/203.18 |
| 5,311,668 A | * | 5/1994 | Longa et al. | ............ 33/203.18 |
| 5,452,606 A | * | 9/1995 | Castelnuovo | ............ 33/203.18 |
| 6,018,878 A | * | 2/2000 | Fukuda et al. | ........... 33/203.12 |
| 6,098,296 A | * | 8/2000 | Perisho et al. | ................ 33/203 |
| 6,313,911 B1 | * | 11/2001 | Stieff | ....................... 33/203.12 |
| 6,453,567 B1 | * | 9/2002 | Naruse | ........................ 33/203 |
| 6,580,988 B2 | | 6/2003 | Lin et al. | |
| 2003/0145663 A1 | | 8/2003 | Heisenberg et al. | |

FOREIGN PATENT DOCUMENTS

DE    197 39 358 A1    3/1999
DE    100 41 095 A1    6/2001

* cited by examiner

*Primary Examiner*—Yaritza Guadalupe-McCall
(74) *Attorney, Agent, or Firm*—Birch, Stewart, Kolasch & Birch, LLP

(57) ABSTRACT

A wheel angle determining device includes a position sensor being provided on a vehicle wheel assembly to directly measure a wheel angle. The wheel assembly having a first portion being fixedly connected to a vehicle and a second portion being rotatable about an axis formed in a plane substantially perpendicular to a vehicle travel direction. The second portion of the vehicle wheel assembly including a vehicle wheel. The position sensor having a first end operatively connected to the first portion of the vehicle wheel assembly and a second end operatively connected to the second portion of the vehicle wheel assembly.

18 Claims, 4 Drawing Sheets

WHEEL POSITION SENSOR

BACKGROUND OF THE INVENTION

1. Field of the Invention

The present invention relates to a position sensor for sensing a position of, for example, a wheel of a vehicle, such as an automobile, a bus, a truck, a tractor, etc., or a position of a rudder or propeller system of a boat, airplane, etc.

2. Description of the Background Art

A steering system is a major system required for driver operation of a vehicle to control a path of the vehicle. Typically, a driver uses a steering wheel that turns a steering shaft. The steering shaft is usually connected through a rack and pinion gear and additional mechanical linkages, such as a tie rod, to the front wheels. The angle between the front wheel plane and the longitudinal axis of the vehicle is commonly referred to as a wheel angle or a steering angle. This wheel angle is proportional to the rotational angle of the driver's steering wheel.

Some vehicles may be designed with a rear wheel steering system that compliments the front wheel steering system. Because the vehicle operator cannot independently operate two steering systems, obviously, the front and rear wheel steering systems must be coordinated, which is preferably performed via an electronic control systems.

A schematic illustration of a vehicle four-wheel steering system is illustrated in FIG. 1, which is described in U.S. Pat. No. 6,580,988. The vehicle 1 includes front wheels 3 and rear wheels 5. The front wheels 3 are steered together using a known gear and linkage mechanism that can be coupled with a power steering system. The front wheels 3 are connected by a tie rod 7, which is attached to control arms (not shown) of the wheels. The vehicle operator steers the front wheels 3 using a steering wheel 9 attached to a steering shaft 11, which is connected to the tie rod 7 by a linkage system (not further shown), for example, a rack and pinion.

A rear wheel steering mechanism is schematically illustrated at 13, which includes a reversible electrical motor drive that actuates a tie rod (not shown) that is operatively connected to the rear wheels 5. The steering of the rear wheels 5, however, is not under the direct control of the vehicle operator. A rear wheel steering controller 15, which receives data concerning the position of the steering wheel 9 from a position sensor 17 that is provided somewhere on the steering shaft 11, controls the rear wheels 5.

As noted above, conventional steering position sensors are typically provided on the steering shaft of a vehicle and must be able to determine at least a 360 degree rotation of the steering shaft, because, as is commonly known, in order for a vehicle operator to steer the wheels to their maximum steering angle, the steering wheel has to be turned through several 360 degree rotations.

U.S. Publication 2003/0145663, which corresponds to DE 100 41 095 A1, discloses a device for measuring an angle by magnetic sensors or optical sensors. This position sensor, however, must still be fashioned to the steering shaft of a vehicle.

The prior art devices, however, are not able to determine the precise wheel angle of a vehicle wheel because they do not take into account mechanical play of the linkages of a vehicle between the steering shaft and the wheels. Further, this mechanical play increases with wear and tear on a vehicle. Thus, the accuracy of the wheel position continuously decreases as the mechanical play between the linkages increases.

In addition, in particular for the case of vehicles having four wheel steering, as described above, the only provision for determining a wheel position of the rear wheels is typically performed by a position sensor provided directly on the steering shaft. Thus, a single position sensor mounted on the steering shaft provides the position of all four wheels of a vehicle.

Moreover, in particular for the case of an optical position sensor, the conventional position sensor are susceptible to dirt and debris and must therefore be mounted along the steering shaft within the vehicle compartment or require a substantial enclosure to protect the position sensor from the environment, which, may not be feasible because of limited space about the steering shaft or because of economic reasons.

SUMMARY OF THE INVENTION

It is therefore an object of the present invention to provide a wheel angle determining device that includes a position sensor being provided on a vehicle wheel assembly to directly measure a wheel angle. The wheel assembly has a first portion being fixedly connected to a vehicle and a second portion being rotatable about an axis formed in a plane substantially perpendicular to a vehicle travel direction. The second portion of the vehicle wheel assembly includes a vehicle wheel. The position sensor has a first end operatively connected to the first portion of the vehicle wheel assembly and a second end operatively connected to the second portion of the vehicle wheel assembly.

In a further embodiment of the present invention, a method for determining a wheel angle is provided. The method includes the steps of providing a position sensor on a vehicle wheel assembly and measuring the wheel angle by the position sensor. The vehicle wheel assembly has a first portion being fixedly connected to a vehicle and a second portion being rotatable about an axis formed in a plane substantially perpendicular to a vehicle travel direction. The position sensor has a first end operatively connected to the first portion of the vehicle wheel assembly and a second end operatively connected to the second portion of the vehicle wheel assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
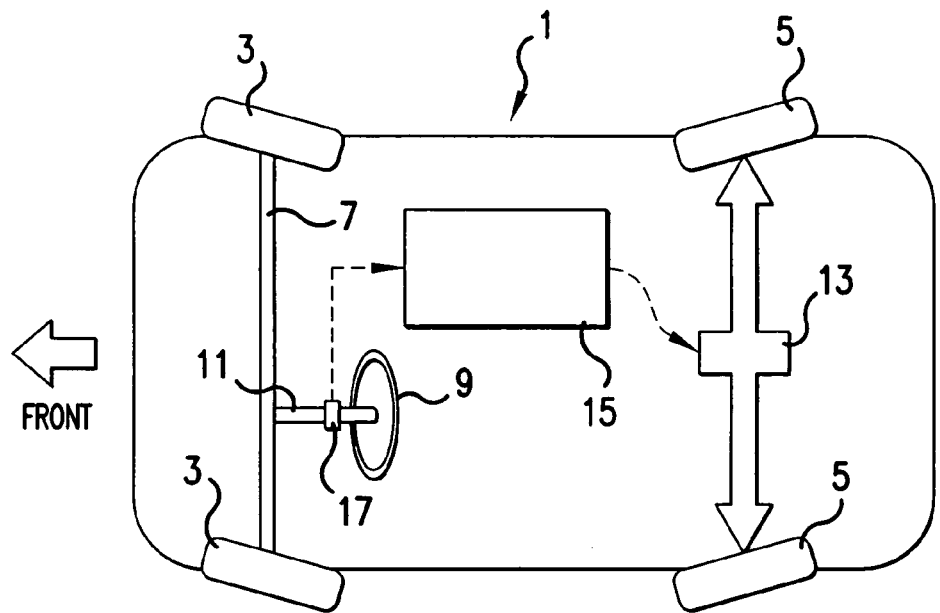
FIG. 1 is an illustration of a conventional vehicle steering system.
Figure 2:
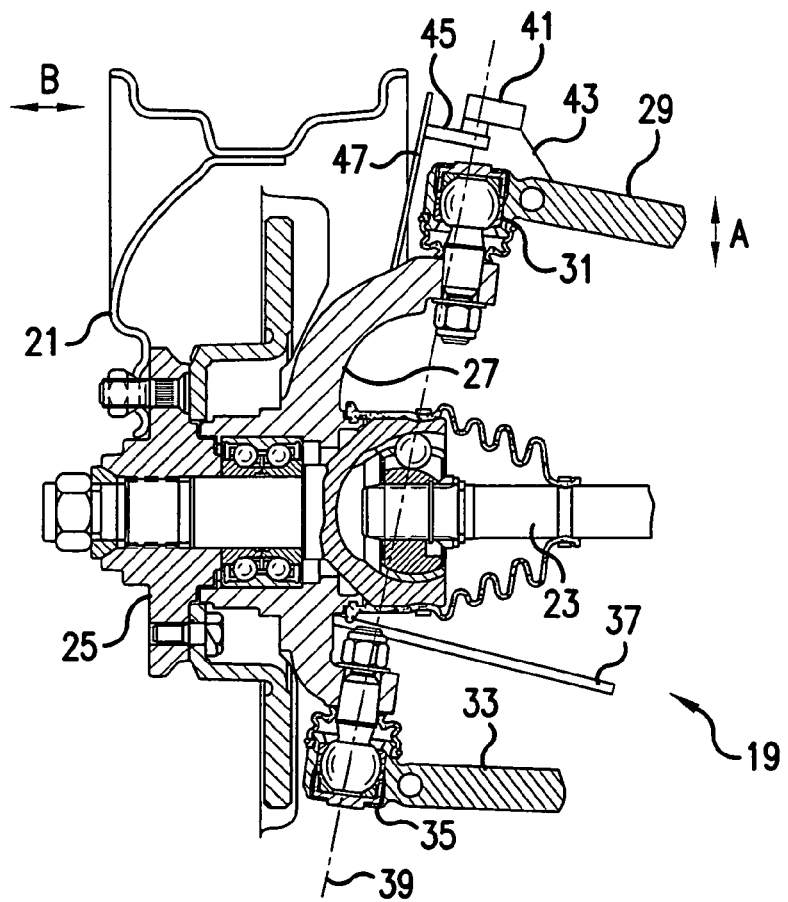
FIG. 2 is an illustration a wheel steering assembly, according to a preferred embodiment of the present invention.

FIG. 2 illustrates a wheel steering assembly 19, according to a preferred embodiment of the present invention. The wheel steering assembly 19 typically includes a wheel 21, an axle shaft 23, a wheel bearing assembly 25 that operatively connects the wheel 21 to the axle shaft 23. The wheel steering assembly 19 can also further include a steering knuckle 27 that is connected to the wheel bearing assembly 25. An upper control arm 29 is connected to the steering knuckle 27 via an upper ball joint 31. A lower control arm 33 is connected to the steering knuckle 27 via a lower ball joint 35. The upper control arm 29 and the lower control arm 33 are usually fixedly connected to a vehicle frame (not shown) so that they can only move in a vertical direction, indicated by arrow A.

In order to displace the wheel 21 in a direction indicated by arrow B, a vehicle operator rotates a steering wheel. This rotation of the steering wheel is transformed into a linear force at, for example, a rack and pinion, to move a tie rod 37 that is connected to the steering knuckle 27. The steering knuckle 27, including the wheel 21 and the wheel bearing assembly 25, thus rotate about an axis 39 formed between the upper ball joint 31 and the lower ball joint 35, thereby increasing or decreasing a wheel angle between the wheel 21 and a vehicle travel direction. Typically, the wheel angle is increased or decreased by approximately 40 degrees with respect to the axis 39.

Figure 3:
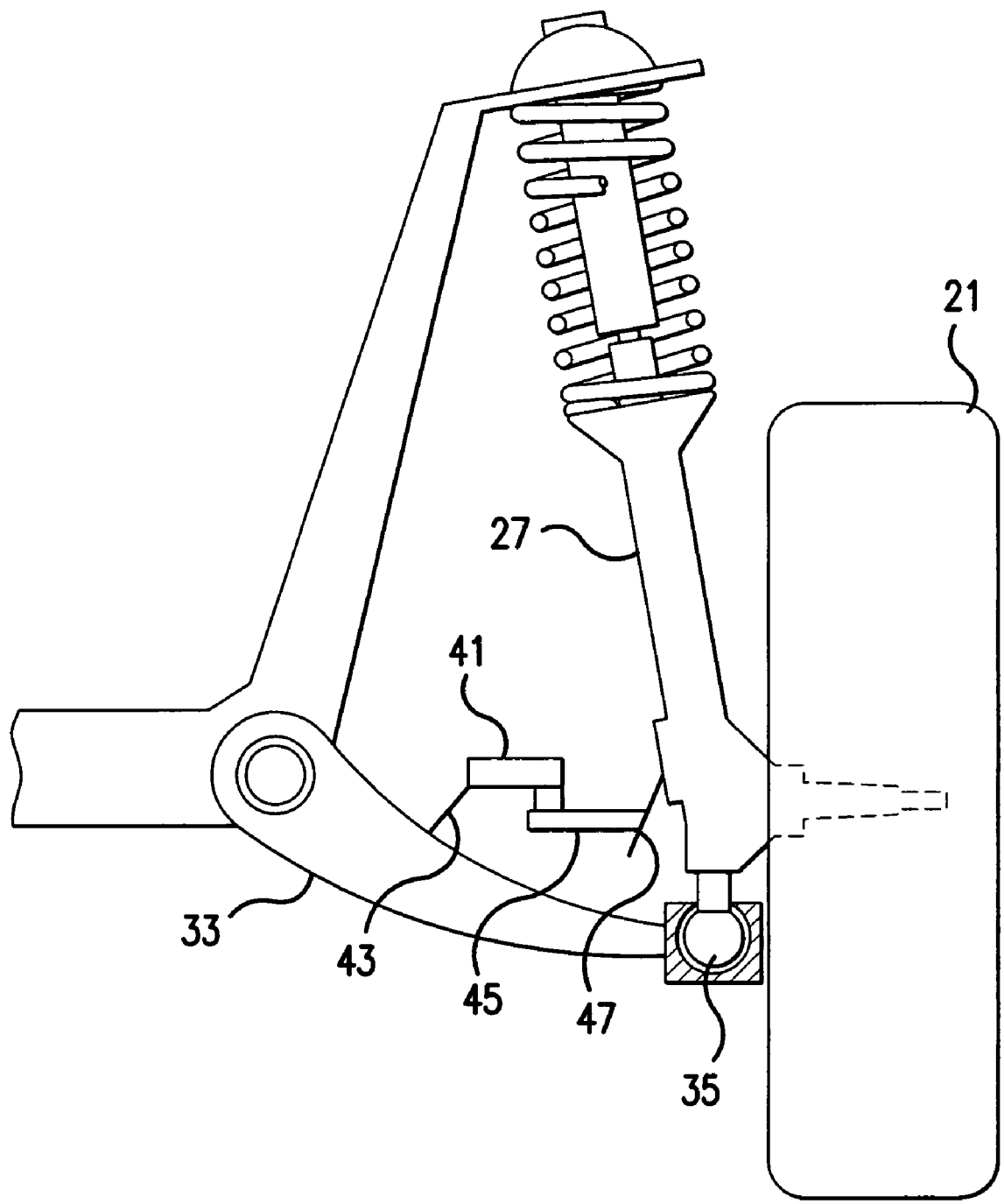
FIG. 3 is an illustration of a wheel steering assembly according to an alternate embodiment of the present invention.

In order to measure this wheel angle, according to a preferred embodiment of the invention, a position sensor 41 is fixedly attached via a bracket 43 to the upper control arm 29. A rotatable lever 45, extending from the position sensor 41 engages a finger 47, which is preferably attached to the steering knuckle 27. In an alternate embodiment, the position sensor 41 can also be attached in a similar fashion between the lower control arm 33 and the steering knuckle 27, as shown in FIG. 3 (wherein like reference numbers denote similar components).

Although the position sensor 41 can also be positioned below the lower control arm 33 and the lower ball joint 35, it is preferred to place the position sensor between the lower control arm 33 and the upper control arm 29, or, as shown in FIG. 2, above the upper control arm 29 in order to protect the position sensor 41 from ground obstacles.

The position sensor 41 can be, for example, an inductive sensor as described in U.S. Pat. Nos. 6,236,199, 6,255,810, 6,366,078, 6,467,338, 6,480,805, which are each incorporated herein by reference, or can be an optical or magnetic sensor. Preferably, the position sensor 41 is a contactless sensor, which is described further below, so that vibrations, due to vehicle travel, do not impact the sensing capabilities of the position sensor 41.

Figure 4:
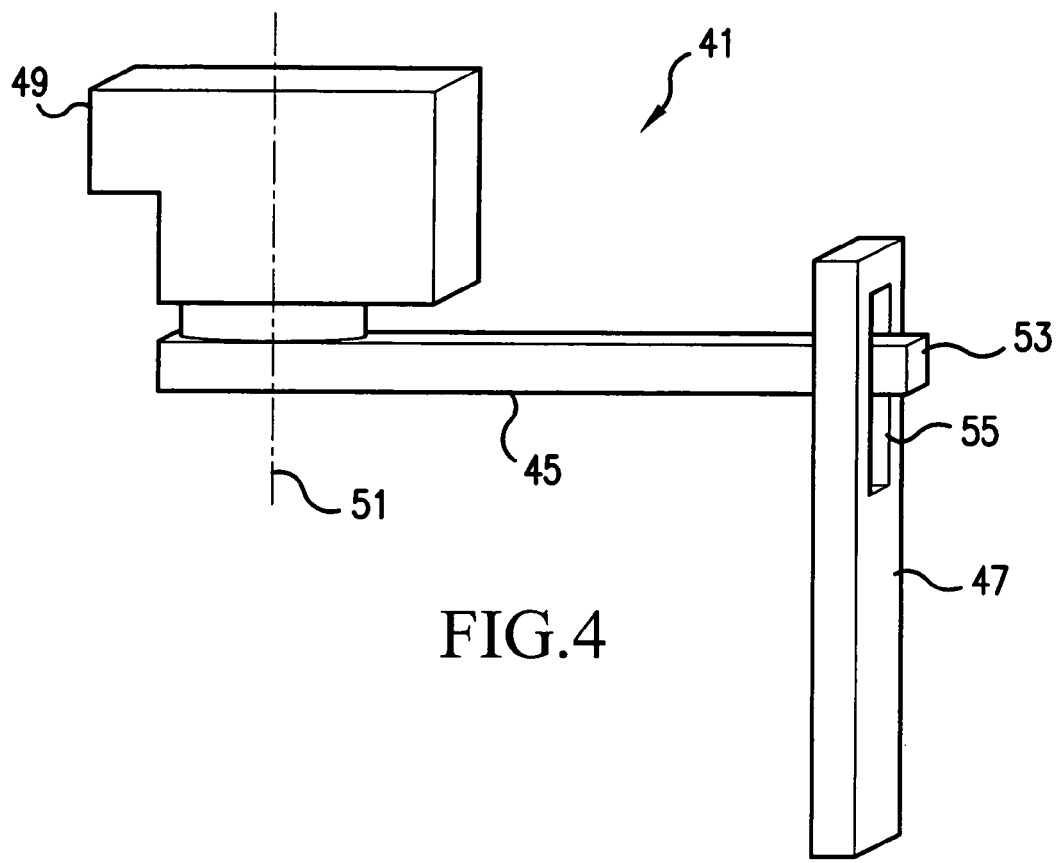
FIG. 4 is an illustration of a position sensor according to a preferred embodiment of the present invention.

FIG. 4 is a schematic illustration of the position sensor 41 according to a preferred embodiment of the present invention. The position sensor 41 further includes a connector 49 to connect the position sensor 41 to a steering controller or other vehicle systems for evaluating a determined wheel position. As noted above, the position sensor 41 is preferably a contactless sensor, which means that an air gap is provided within the position sensor 41 between the lever 45 and sensing elements (not shown).

The lever 45 is adapted to rotate about a sensor axis 51, which, when the position sensor 41 is mounted as described above, the sensor axis 51 is fashioned to be parallel to the axis 39. In a preferred embodiment, the sensor axis 51 and the axis 39 coextend, as shown, for example, in FIG. 2. The lever 45 is rotatably fixed to the position sensor 41 in a known manner so as to prevent debris from entering the position sensor 41.

A lever end 53 extends into a longitudinal slit 55 that is provided in the finger 47. This longitudinal slit 55 is formed so that the lever 45 is able to move in a vertical fashion so that the position sensor 41 is not hampered due to vertical movement of the wheel 21 with respect to the vehicle frame while the vehicle is in motion. The longitudinal slit 55 is also formed so as to prevent horizontal movement, e.g., movement in a plane parallel to the wheel angle.

Figure 5:
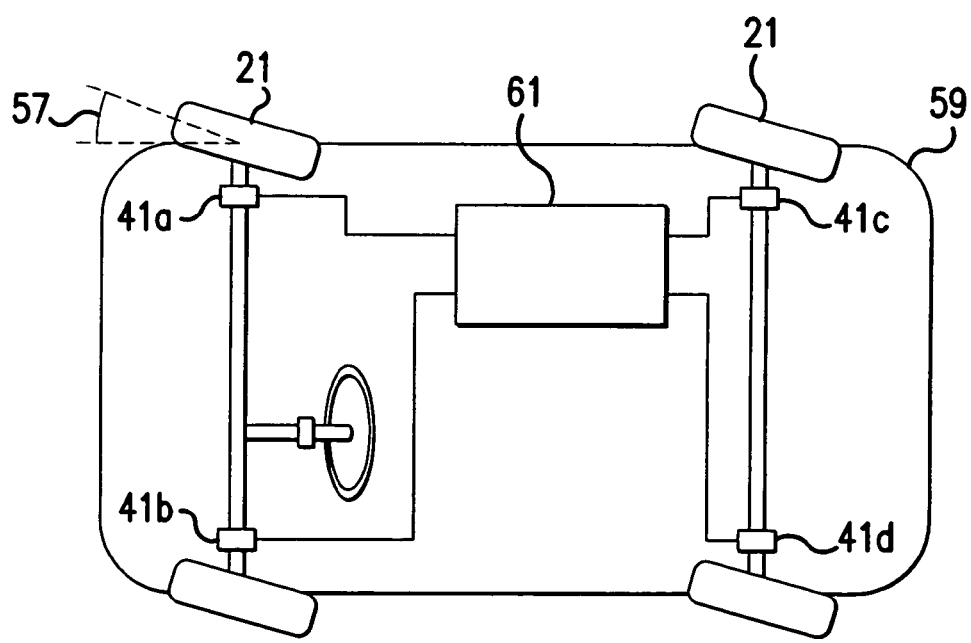
FIG. 5 is an illustration of position sensors being positioned on a vehicle.

In a preferred embodiment, position sensors 41a–d are provided on each wheel 21 to directly measure the wheel angle 57 of each wheel 21, as shown in FIG. 5. Each of the position sensors 41a–d can be connected to a steering controller 61 to thereby process the measured wheel angle of each of the wheels 21. Corresponding positions sensors, e.g., 41a,b and 41c,d can be utilized as redundant systems (discussed further below), whereby the values from each sensor can be average or utilized to check the position of each of the wheels 21. Thereby, position errors, for example, toe-in or toe-out problems of the wheel 21, can be recognized and the vehicle operator can be alerted.

In addition, because the position sensors 41a–d directly measure the wheel angle 57 for each of the wheels 21, the position sensor 41 can accurately measure the wheel angle 57 without errors caused by mechanical play between linkages of the steering mechanism as in the conventional art. Such a system is particularly advantageous in a four-wheel steering system, whereby each wheel 21 is individually steered.

In a vehicle that steers with only two wheels 21, an optimum contact between the wheel and the driving surface can never be achieved because each wheel has a slip-portion during a curve, which decreases the maximum force that can be transmitted between the vehicle and the driving surface. However, in a vehicle that has four-wheel steering, in particular, where each wheel is individually controlled, i.e., the individual wheel angle is determined and controlled, the slip-portion is improved and therefore the behavior of the vehicle in a curve is greatly improved.

Figure 6:
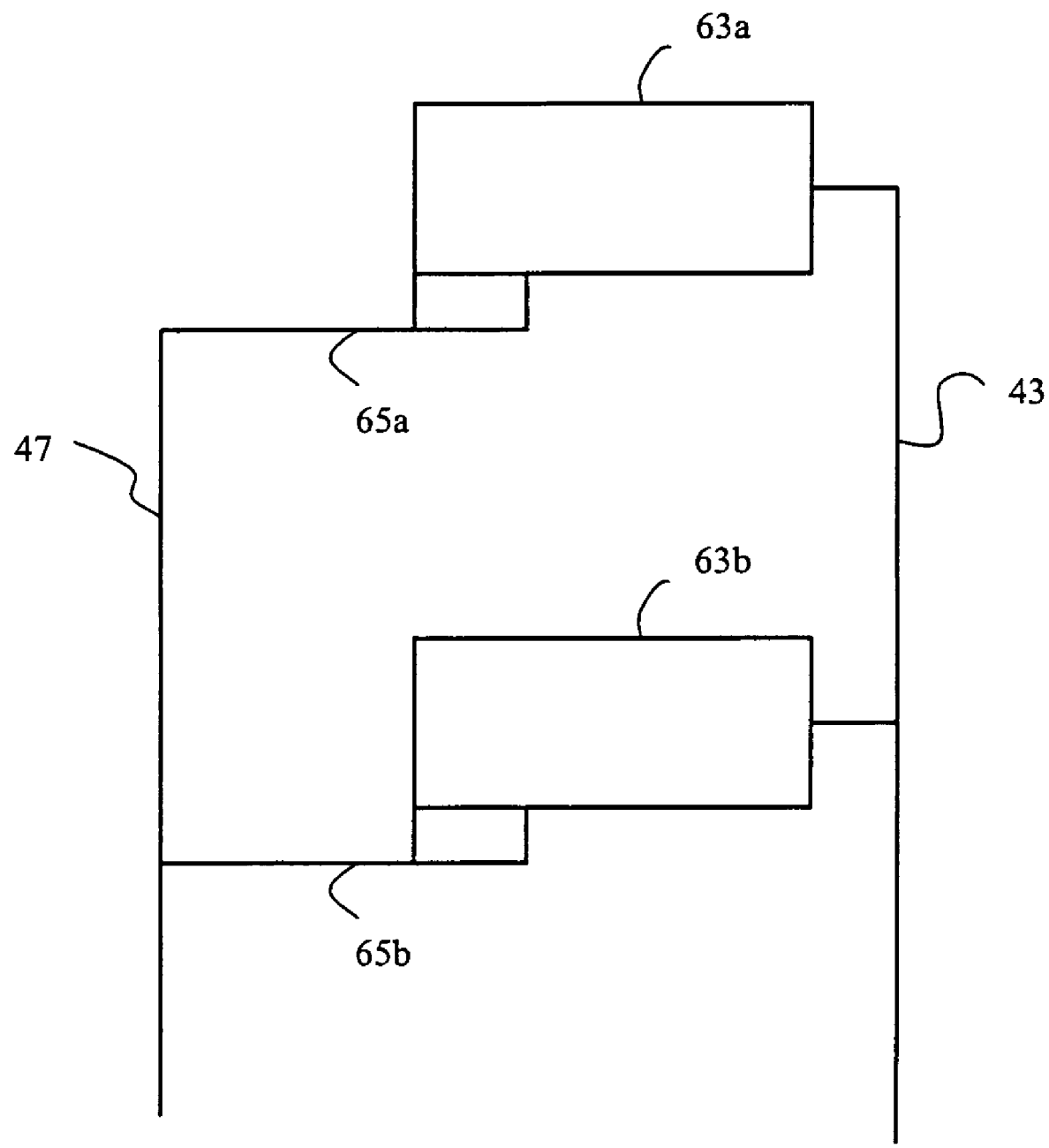
FIG. 6 is an illustration of a redundant system according to an alternate embodiment of the present invention.

In a further embodiment of the present invention two or more position sensors can be provided at each wheel for redundancy for, for example, for a fault tolerant system, which is discussed further below. Referring to FIG. 6, there is shown an example of such a redundant system, in which two position sensors 63 a,b utilize the same bracket 43 and finger 47, however, they each have their own levers 65 a, b. Alternatively, the position sensors 63a, b can be provided so that one is attached to the upper control arm 29 and the other is attached to the lower control arm 33. Although the position sensors 63, a,b are shown in FIG. 6 as having their own housing, the position sensors 63 a,b can also be designed so as to have one housing and/or to utilize one lever.

In a fault tolerant system it is desirable to have redundant systems so that if one system fails in a vehicle, the vehicle can continue to operate because of the redundant system. For example, if one of the position sensors has an error, such as a loose connector, the second sensor, which measures the same wheel angle as the first position sensor, is still able to provide recognizable data. If three or more position sensors are utilized at each wheel of a vehicle, then, if one of the sensors develops an error, the vehicle system would be able to determine which sensor has the error on the basis of the other position sensors measuring the same wheel angle. Such a redundant system would be beneficial for, for example, a steer by wire vehicle and/or a vehicle that has four-wheel steering, whereby each wheel is individually steered.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A wheel angle determining device comprising:
   a position sensor being provided on a vehicle wheel assembly to directly measure a wheel angle, the wheel assembly having a first portion being fixedly connected to a vehicle and a second portion being rotatable about an axis formed in a plane substantially perpendicular to a vehicle travel direction, the second portion of the vehicle wheel assembly including a vehicle wheel,
   wherein the position sensor has a first end operatively connected to the first portion of the vehicle wheel assembly and a second end operatively connected to the second portion of the vehicle wheel assembly, and
   wherein the second end of the position sensor is connected to the second portion by a finger and a rotatable lever.

2. The wheel angle determining device according to claim 1, wherein the first portion is fixedly connected to the vehicle by a control arm.

3. The wheel angle determining device according to claim 1, wherein the second portion further includes a steering knuckle and a wheel bearing assembly.

4. The wheel angle determining device according to claim 1, wherein the first end of the position sensor is connected to the first portion by a bracket.

5. The wheel angle determining device according to claim 4, wherein the bracket is directly connected to the first end of the position sensor and is directly connected to a control arm, which is fixedly connected to the vehicle.

6. The wheel angle determining device according to claim 1, wherein the rotatable lever is rotatably attached to the position sensor.

7. The wheel angle determining device according to claim 6, wherein the rotatable lever extends through a longitudinal slit that is provided in the finger.

8. The wheel angle determining device according to claim 7, wherein the longitudinal slit is formed so as to allow the rotatable lever to move vertically therein.

9. The wheel angle determining device according to claim 1, wherein the finger is directly connected to a steering knuckle, the steering knuckle being provided in the second portion of the vehicle wheel assembly.

10. The wheel angle determining device according to claim 1, wherein the axis is formed between an upper ball joint and a lower ball joint.

11. The wheel angle determining device according to claim 1, wherein a plurality of position sensors are provided on the vehicle wheel assembly to measure the wheel angle.

12. The wheel angle determining device according to claim 1, wherein the position sensor is a contactless sensor, an inductive sensor, a magnetic sensor, or an optical sensor.

13. The wheel angle determining device according to claim 1, wherein the position sensor has a sensor axis.

14. The wheel angle determining device according to claim 13, wherein the sensor axis is parallel to the axis formed in the plane substantially perpendicular to the vehicle travel direction.

15. The wheel angle determining device according to claim 13, wherein the sensor axis coextends with the axis formed in the plane substantially perpendicular to the vehicle travel direction.

16. The wheel angle determining device according to claim 1, wherein the vehicle has four wheel assemblies and at least one position sensor for each wheel assembly.

17. The wheel angle determining device according to claim 1, wherein the wheel angle of each wheel of the vehicle is controlled by a steering controller on the basis of the determined wheel angle.

18. The wheel angle determining device according to claim 17, wherein each wheel is individually controlled by the steering controller.

* * * * *